United States Patent
Murakami et al.

(10) Patent No.: US 9,485,822 B2
(45) Date of Patent: Nov. 1, 2016

(54) LIGHTING DEVICE, LUMINAIRE USING LIGHTING DEVICE, AND LIGHTING SYSTEM USING LUMINAIRE

(71) Applicant: Panasonic Intellectual Property Management Co., Ltd., Osaka (JP)

(72) Inventors: Shinichi Murakami, Osaka (JP); Koji Watanabe, Kyoto (JP); Kazuhiro Kumada, Hyogo (JP); Miyo Kangyo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/974,449

(22) Filed: Dec. 18, 2015

(65) Prior Publication Data
US 2016/0192449 A1   Jun. 30, 2016

(30) Foreign Application Priority Data
Dec. 25, 2014 (JP) .................... 2014-263044

(51) Int. Cl.
*H05B 37/00* (2006.01)
*H05B 33/08* (2006.01)

(52) U.S. Cl.
CPC ...... *H05B 33/0824* (2013.01); *H05B 33/0815* (2013.01)

(58) Field of Classification Search
CPC .......... H05B 33/0818; H05B 33/0815; H05B 33/0851; H05B 33/086; H05B 33/0896; H05B 33/0887; H05B 33/089; H05B 37/02; Y02B 20/346; H02H 9/002; H02M 2003/1586; H02M 3/155; H02M 3/1584
See application file for complete search history.

(56) References Cited

U.S. PATENT DOCUMENTS

| | | | |
|---|---|---|---|
| 9,089,033 B2* | 7/2015 | Kumada | H05B 33/089 |
| 9,232,617 B2* | 1/2016 | Matsumoto | H05B 41/18 |
| 2012/0194075 A1 | 8/2012 | Iwai et al. | |
| 2012/0262082 A1 | 10/2012 | Esaki et al. | |
| 2013/0127367 A1 | 5/2013 | Esaki et al. | |
| 2014/0035462 A1* | 2/2014 | Kumada | H05B 33/089 315/127 |
| 2015/0035447 A1* | 2/2015 | Kamoi | H05B 33/0818 315/224 |
| 2015/0201477 A1* | 7/2015 | Watanabe | H05B 33/0815 315/210 |
| 2015/0207412 A1* | 7/2015 | Kumada | H02M 3/1584 323/271 |

FOREIGN PATENT DOCUMENTS

| | | |
|---|---|---|
| JP | 2012-160321 A | 8/2012 |
| JP | 2012-160322 A | 8/2012 |
| JP | 2012-226924 A | 11/2012 |
| JP | 2013-026024 A | 2/2013 |
| JP | 2013-109913 A | 6/2013 |

* cited by examiner

*Primary Examiner* — Monica C King
(74) *Attorney, Agent, or Firm* — Renner, Otto, Boisselle & Sklar, LLP

(57) ABSTRACT

A lighting device includes at least first and second lighting circuits configured to receive electric power from a single common DC power supply. First lighting circuit includes a first output capacitor connected between output ends thereof, and a first pre-charge circuit configured to keep a voltage across first output capacitor at a first voltage for first lighting circuit, while a first light source is in OFF state. Second lighting circuit includes a second output capacitor connected between output ends thereof; and a second pre-charge circuit configured to keep a voltage across second output capacitor at a second voltage for second lighting circuit, while a second light source is in OFF state. First and second voltages are set such that a difference between a forward voltage of first light source and the first voltage agrees with a difference between a forward voltage of second light source and the second voltage.

18 Claims, 6 Drawing Sheets

LIGHTING DEVICE, LUMINAIRE USING LIGHTING DEVICE, AND LIGHTING SYSTEM USING LUMINAIRE

CROSS-REFERENCE TO RELATED APPLICATIONS

The application is based upon and claims the benefit of priority of Japanese Patent Application No. 2014-263044, filed on Dec. 25, 2014, the entire content of which is incorporated herein by reference.

TECHNICAL FIELD

This disclosure relates to a lighting device, a luminaire using the lighting device, and a lighting system using the luminaire.

BACKGROUND ART

Conventionally, there has been provided a lighting device that includes two or more lighting circuits connected in parallel with a single DC power supply (e.g., see JP 2013-109913 A). Each lighting circuit includes a capacitor that is connected between output ends (hereinafter, referred to as an "output capacitor"). The two or more lighting circuits are configured to light two or more different light sources, respectively. Each light source is constituted by a series circuit of two or more light-emitting diodes.

For example, when the lighting device includes three lighting circuits, and colors of light emitted from three light sources connected with the three lighting circuits correspond one-to-one to three primary colors of light, respectively, various light colors can be realized as the color mixture of the light from the three light sources, by the three lighting circuits being controlled individually.

Here generally, in a case where a light source includes a solid-state light-emitting element such as a light-emitting diode, the light source emits light when a voltage input to the light source is a prescribed forward voltage or more. In other words, when each of the above-mentioned lighting circuits starts operation for causing a corresponding light source to emit light, the corresponding light source starts light emission at a time when an output voltage of the lighting circuit (i.e., a voltage across the output capacitor thereof) reaches a forward voltage of the corresponding light source.

However, depending on a difference between forward voltages of the light sources or a difference between time constants of the circuits, there has been a possibility that a time period between a time point at which a lighting circuit starts operation for causing a corresponding light source to emit light and a time point at which the corresponding light source actually emits light (hereinafter, referred to as a "start time period") may be different from that in the case of another lighting circuit.

Especially when brightness is adjusted by intermittent lighting, the difference between the start time periods causes variation in the brightness and further variation in the light color provided by the color mixture.

SUMMARY

It is an object of the present technology to provide a lighting device, a luminaire using the lighting device and a lighting system using the luminaire, which can reduce a difference between start time periods for lighting circuits.

A lighting device of an aspect according to the present technology includes, as at least two lighting circuits, a first lighting circuit and a second lighting circuit that are configured to receive electric power from a single common power supply for providing power to first and second light sources, respectively, each including one or more solid-state light-emitting elements. The first lighting circuit is configured to cause the first light source to emit light. The second lighting circuit is configured to cause the second light source, which is different from the first light source, to emit light. Each of the first and second lighting circuits includes a switching power supply. The first lighting circuit further includes: a first output capacitor connected between output ends of the first lighting circuit; and a first pre-charge circuit configured to keep a voltage across the first output capacitor at a first voltage predetermined for the first lighting circuit, while the first light source is in OFF state. The second lighting circuit further includes: a second output capacitor connected between output ends of the second lighting circuit; and a second pre-charge circuit configured to keep a voltage across the second output capacitor at a second voltage predetermined for the second lighting circuit, while the second light source is in OFF state. The first and second voltages are set such that a difference between a forward voltage of the first light source and the first voltage agrees with a difference between a forward voltage of the second light source and the second voltage.

A lighting device of another aspect according to the present technology includes, as at least two lighting circuits, a first lighting circuit and a second lighting circuit that are configured to receive electric power from a single common power supply for providing power to first and second light sources, respectively, each including one or more solid-state light-emitting elements. The first lighting circuit is configured to cause the first light source to emit light. The second lighting circuit is configured to cause the second light source, which is different from the first light source, to emit light. The first lighting circuit includes: a first output capacitor connected between output ends of the first lighting circuit; and a switching power supply configured to perform, while the first light source is in ON state, constant current operation for adjusting an output current to be output to the first light source to a first target current predetermined for the first lighting circuit. The second lighting circuit includes: a second output capacitor connected between output ends of the second lighting circuit; and a switching power supply configured to perform, while the second light source is in ON state, constant current operation for adjusting an output current to be output to the second light source to a second target current predetermined for the second lighting circuit. Capacitance values of the first and second output capacitors are set such that a ratio between the capacitance value of the first output capacitor and the first target current agrees with a ratio between the capacitance value of the second output capacitor and the second target current.

A lighting device of yet another aspect according to the present technology includes, as at least two lighting circuits, a first lighting circuit and a second lighting circuit that are configured to receive electric power from a single common power supply for providing power to first and second light sources, respectively, each including one or more solid-state light-emitting elements. The first lighting circuit is configured to cause the first light source to emit light. The second lighting circuit is configured to cause the second light source, which is different from the first light source, to emit light. The first lighting circuit includes a switching power supply configured to perform, while the first light source is in ON state, constant current operation for adjusting an output current to be output to the first light source to a first target current predetermined for the first lighting circuit. The first lighting circuit further includes: a first output capacitor connected between output ends of the first lighting circuit; and a first pre-charge circuit configured to keep a voltage across the first output capacitor at a first voltage predetermined for the first lighting circuit, while the first light source is in OFF state. The second lighting circuit includes a switching power supply configured to perform, while the second light source is in ON state, constant current operation for adjusting an output current to be output to the second light source to a second target current predetermined for the second lighting circuit. The second lighting circuit further includes a second output capacitor connected between output ends of the second lighting circuit; and a second pre-charge circuit configured to keep a voltage across the second output capacitor at a second voltage predetermined for the second lighting circuit, while the second light source is in OFF state. The first and second voltages, and capacitance values of the first and second output capacitors are set such that a first value agrees with a second value. The first value is obtained by dividing, by the first target current, a product of: the difference between the forward voltage of the first light source and the first voltage; and the capacitance value of the first output capacitor. The second value is obtained by dividing, by the second target current, a product of: the difference between the forward voltage of the second light source and the second voltage; and the capacitance value of the second output capacitor.

A luminaire of an aspect according to the present technology includes any one of the above-mentioned lighting devices and the first and second light sources respectively coupled across the first and second output capacitors.

A lighting system of an aspect according to the present technology includes: at least two luminaires mentioned above; and a control device configured to control the at least two luminaires individually.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Embodiments 1 to 3 below relate to lighting devices, luminaires using the lighting devices, and lighting systems using the luminaires, and more particularly, to a lighting device for causing a light source including one or more solid-state light-emitting elements to emit light, a luminaire using the lighting device, and a lighting system using the luminaire. Hereinafter, Embodiments 1 to 3 will be described with reference to figures.

Embodiment 1

Figure 1:
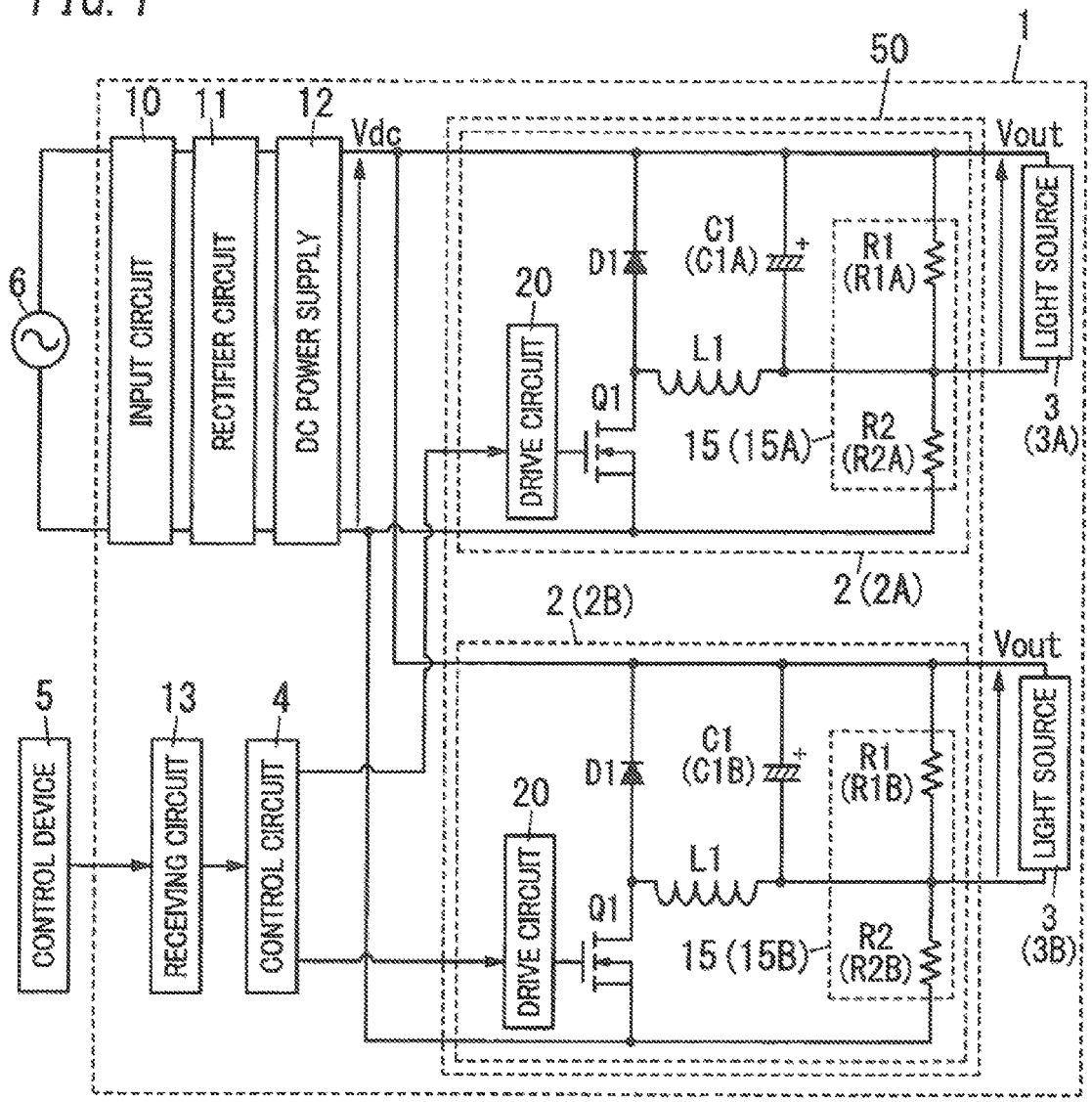
FIG. 1 is a circuit block diagram illustrating a luminaire according to Embodiment 1.

As shown in FIG. 1, a luminaire 1 of the present embodiment includes two or more light sources 3 (e.g., a first light source 3A and a second light source 3B in FIG. 1), and two or more lighting circuits 2 (e.g., a first lighting circuit 2A and a second lighting circuit 2B in FIG. 1) that are configured to cause the two or more different light sources 3 to emit light, respectively. Each light source 3 includes one or more solid-state light-emitting elements 30 (refer to FIG. 3). The two or more lighting circuits 2 are configured to receive electric power from a single common DC power supply 12. The two or more lighting circuits 2 constitute a lighting device 50. The luminaire 1 further includes a control circuit 4 that is configured to control the two or more lighting circuits 2 individually.

Figure 2:
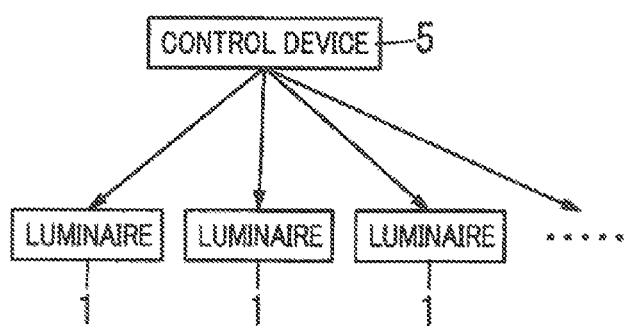
FIG. 2 is a diagram illustrating one example of a lighting system using luminaires according to Embodiment 1.

The luminaire 1 of the present embodiment further includes a receiving circuit 13 that is configured to receive a control signal transmitted from an external control device 5. The control circuit 4 operates in response to the control signal received by the receiving circuit 13. A lighting system of the present embodiment includes two or more luminaires 1 and the single control device 5 that is configured to control the two or more luminaires 1, as shown in FIG. 2. The above-mentioned control signal may be a cable signal or a radio signal. In the case where the control signal is an electric signal, it may be an analog signal in which control content is indicated by a voltage value, or a so-called PWM signal in which control content is indicated by a duty ratio. The control device 5 may transmit the control signal according to an operation input that is input to a touch panel, a switch or like, or according to a program that is previously stored.

The luminaire 1 of the present embodiment further includes: the DC power supply 12; a rectifier circuit 11 that is configured to full-wave rectify an AC current input from an external AC power supply 6; and an input circuit 10 that is provided between the AC power supply 6 and the rectifier circuit 11.

The DC power supply 12 is a so-called power factor improving circuit that is configured to convert a DC output of the rectifier circuit 11 to DC power having a prescribed voltage Vdc, and output the converted power. For example, the DC power supply 12 may be a step-up chopper circuit.

The input circuit 10 is a filter circuit that includes e.g., a common mode choke and an across-the-line capacitor for suppressing transmission and reception of noise between the AC power supply 6 and the rectifier circuit 11 The input circuit 10 may further include a well-known surge absorbing element such as a varistor, and a fuse.

The respective first and second lighting circuits 2A and 2B are configured to cause the first and second light sources 3A and 3B to emit light, using DC power obtained by converting a voltage of DC power supplied from the DC power supply 12. The solid-state light-emitting element(s) 30 constituting each light source 3 may be a light-emitting diode(s) or an organic electroluminescence (EL) element(s), for example. When each light source 3 includes two or more solid-state light-emitting elements 30, the solid-state light-emitting elements 30 may be connected in series with each other, or in parallel with each other. Alternatively, two or more series circuits, each of which includes two or more solid-state light-emitting elements 30 connected in series with each other, may be connected in parallel with each other.

The lighting circuits 2 are so-called step-down choppers. In other words, each lighting circuit 2 includes: an output capacitor C1 connected in parallel with a corresponding light source 3; an inductor L1 constituting a series circuit together with the output capacitor C1; and a switching element Q1 for turning on/off DC power to be input from the DC power supply 12 to the above-mentioned series circuit. Each lighting circuit 2 further includes a drive circuit 20 for carrying out on/off driving of the switching element Q1. The switching element Q1 may be an enhancement type of N-channel MOSFET. During an OFF period of the first light source 3A, the drive circuit 20 of the first lighting circuit 2A keeps the switching element Q1 of the first lighting circuit 2A in an OFF-state, and turns ON the switching element Q1 of the first lighting circuit 2A upon starting lighting of the first light source 3A. Similarly, during an OFF period of the second light source 3B, the drive circuit 20 of the second lighting circuit 2B keeps the switching element Q1 of the second lighting circuit 2B in an OFF-state, and turns ON the switching element Q1 of the second lighting circuit 2B upon starting lighting of the second light source 3B. During an ON period of the first light source 3A, the drive circuit 20 of the first lighting circuit 2A turns OFF the switching element Q1 of the first lighting circuit 2A when a current flowing through the switching element Q1 of the first lighting circuit 2A reaches a prescribed OFF-threshold, for example, and then turns ON the switching element Q1 of the first lighting circuit 2A again when a current flowing through the inductor L1 of the first lighting circuit 2A becomes zero. In addition, during the ON period of the first light source 3A, the drive circuit 20 of the first lighting circuit 2A performs constant current operation for keeping an output current from the output capacitor C1A to a prescribed target current. Similarly, during an ON period of the second light source 3B, the drive circuit 20 of the second lighting circuit 2B turns OFF the switching element Q1 of the second lighting circuit 2B when a current flowing through the switching element Q1 of the second lighting circuit 2B reaches a prescribed OFF-threshold, for example, and then turns ON the switching element Q1 of the second lighting circuit 2B again when a current flowing through the inductor L1 of the second lighting circuit 2B becomes zero. In addition, during the ON period of the second light source 3B, the drive circuit 20 of the second lighting circuit 2B performs constant current operation for keeping an output current from the output capacitor C1B to a prescribed target current. Specifically, for example, the constant current operation in each of the first and second lighting circuits 2A and 2B is a feedback operation for monitoring the output current from the output capacitor C1 and changing the above-mentioned OFF-threshold at any time so as to keep the output current to the prescribed target current. The current flowing through the switching element Q1 and the output current from the output capacitor C1 may be detected with shunt resistors, for example. The timing when the current flowing through the inductor L1 becomes zero may be detected with a secondary winding that is provided in the inductor L1, for example.

Note that, in the explanation described below, the output capacitor C1 of the first lighting circuit 2A is referred to also as a first output capacitor C1A, and the output capacitor C1 of the second lighting circuit 2B is referred to also as a second output capacitor C1B.

The control circuit 4 controls the drive circuit 20 of each lighting circuit 2 so as to switch on/off of a corresponding light source 3 and change brightness of the corresponding light source 3, according to the control signal received from the control device 5 via the receiving circuit 13. The change of the brightness of each light source 3 is realized by changing a duty ratio for the intermittent lighting that is performed at a period, which is sufficiently short to an extent that light from each light source 3 is not perceived as being flashing by human eyes.

Figure 3:
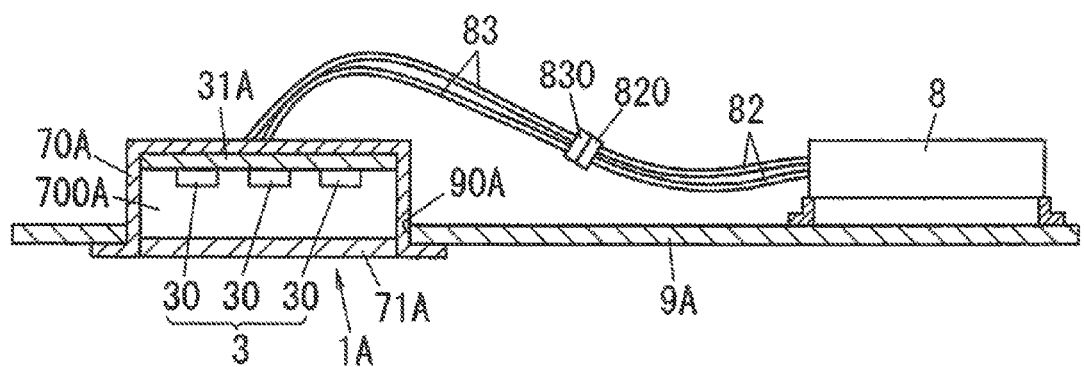
FIG. 3 is a diagram illustrating one example of a structure of the luminaire according to Embodiment 1.
Figure 4:
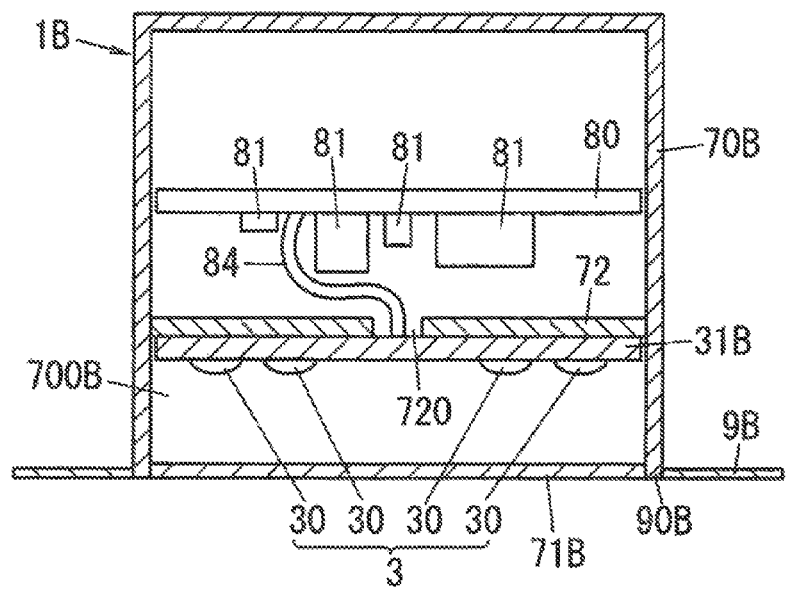
FIG. 4 is a diagram illustrating another example of a structure of the luminaire according to Embodiment 1.

FIG. 3 shows as one example a structure of the luminaire 1 of the present embodiment (hereinafter, referred to as a luminaire 1A), and FIG. 4 shows as another example a structure of the luminaire 1 of the present embodiment (hereinafter, referred to as a luminaire 1B).

Regarding the luminaire 1A in FIG. 3, two or more solid-state light-emitting elements (light-emitting diodes) 30 constituting each light source 3 are mounted on one surface of a single printed wiring board 31A (hereinafter, referred to as a "mounting surface"). Similarly, regarding the luminaire 1B in FIG. 4, two or more solid-state light-emitting elements (light-emitting diodes) 30 constituting each light source 3 are mounted on one surface of a single printed wiring board 31B (hereinafter, referred to as a "mounting surface"). The luminaire 1A includes: a luminaire body 70A that has a storage recess 700A in which two light sources 3 are stored (only a single light source 3 being shown in cross-section); and a light transmissive cover 71A that has light transmissivity and is coupled with the luminaire body 70A to cover the storage recess 700A. Similarly, the luminaire 1B includes: a luminaire body 70B that has a storage recess 700B in which two light sources 3 are stored (again, only a single light source 3 being shown in cross-section); and a light transmissive cover 71B that has light transmissivity and is coupled with the luminaire body 70B to cover the storage recess 700B. Materials for the light transmissive covers 71A and 71B may be polycarbonate resin or acrylic resin, for example. Regarding the luminaire 1A, the printed wiring board 31A is fixed in the storage recess 700A such that the mounting surface thereof faces the light transmissive cover 71A, and accordingly, light from each solid-state light-emitting element 30 is emitted outward through the light transmissive cover 71A. Similarly, regarding the luminaire 1B, the printed wiring board 31B is fixed in the storage recess 700B such that the mounting surface thereof faces the light transmissive cover 71B, and accordingly, light from each solid-state light-emitting element 30 is emitted outward through the light transmissive cover 71B. Regarding the luminaire 1A, the luminaire body 70A is fixed to a ceiling member 9A, in a state where an opening of the storage recess 700A is turned downward and the luminaire body 70A is inserted into an embedding hole 90A that is provided in the ceiling member 9A. Similarly, regarding the luminaire 1B, the luminaire body 70B is fixed to a ceiling member 9B, in a state where an opening of the storage recess 700B is turned downward and the luminaire body 70B is inserted into an embedding hole 90B that is provided in the ceiling member 9B.

Regarding the luminaire 1A in FIG. 3, the printed wiring board 31A (on which the two light sources 3 are mounted) is fixed on an inner bottom face of the storage recess 700A. Also regarding the luminaire 1A, a housing 8 is provided separately from the luminaire body 70A, and houses therein the first and second lighting circuits 2A and 2B, the control circuit 4, the input circuit 10, the rectifier circuit 11, the DC power supply 12 and the receiving circuit 13 (shown in FIG. 1). The housing 8 is disposed on an upper side of the ceiling member 9A (a so-called wiring space). The first and second lighting circuits 2A and 2B are electrically connected with the first and second light sources 3A and 3B via two or more wires 82 and 83 that are provided with connectors 820 and 830, respectively. It is therefore possible to easily change the connection between the first and second lighting circuits 2A and 2B and the first and second light sources 3A and 3B by attachment/detachment of the connectors 820 and 830.

On the other hand, regarding the luminaire 1B in FIG. 4, the luminaire body 70B includes a partition 72 for vertically partitioning the inside of the storage recess 700B. The printed wiring board 31B (on which the two light sources 3 are mounted) is fixed on a lower side of the partition 72. Circuit components 81 constitute the first and second lighting circuits 2A and 2B, the control circuit 4, the input circuit 10, the rectifier circuit 11, the DC power supply 12 and the receiving circuit 13, and are mounted on one surface of a printed wiring board 80 so as to be fixed above the partition 72 in the storage recess 700B. The partition 72 is provided with a wire insertion hole 720 into which wires 84 are inserted for electrically connecting the respective first and second lighting circuits 2A and 2B to the first and second light sources 3A and 3B.

FIG. 3 shows only two wires 82 and two wires 83, and FIG. 4 shows only one wire 84. However, in the example of FIG. 3, two wires 82 and two wires 83 are actually used for a single lighting circuit 2 (in other words, four wires 82 and four wires 83 in total). Similarly, in the example of FIG. 4, two wires 84 are actually used for a single lighting circuit 2 (in other words, four wires 84 in total). That is, each of the numbers of wires 82, 83 and 84 is twice the number of lighting circuits 2. The two or more wires 82 may be bundled as a single cable, and also the two or more wires 83 may be bundled as a single cable. Similarly the wires 84 may be bundled as a single cable.

Figure 5:
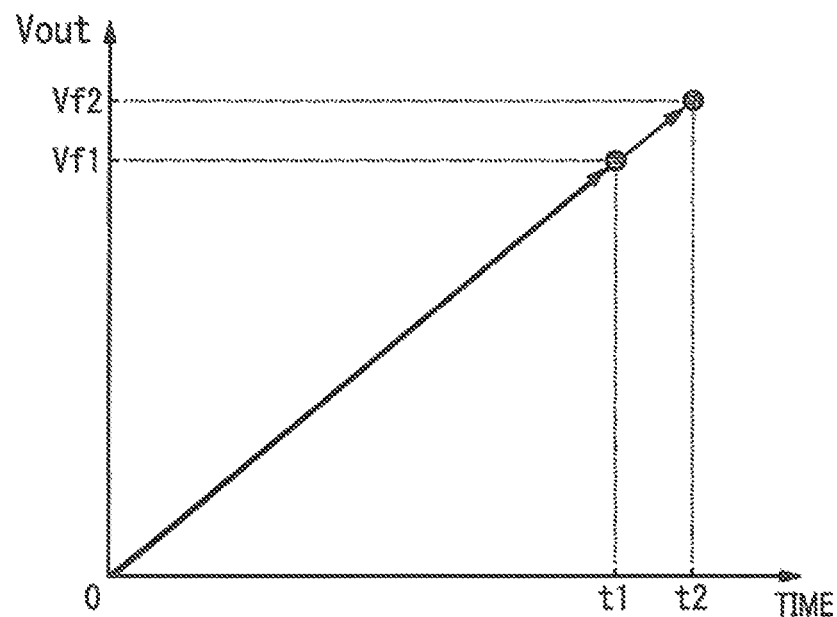
FIG. 5 is a diagram illustrating one example of a change in an output voltage Vout with time after starting of two lighting circuits in a comparative example with respect to Embodiment 1.

Here, there is a case where the two or more respective light sources 3, connected with the two or more lighting circuits 2, have forward voltages different from each other. For example, there is a case where the respective first and second light sources 3A and 3B, connected with the first and second lighting circuits 2A and 2B, have forward voltages Vf1 and Vf2 (Vf1<Vf2) different from each other. In this case, when considering a comparative example in which each lighting circuit 2 does not include a pre-charge circuit 15 described later, a start time period t2 of a second lighting circuit 2B (connected with a second light source 3B having a higher forward voltage Vf2) becomes longer than a start time period t1 of a first lighting circuit 2A, as the voltage Vout applied thereacross increases with respect to time as shown in FIG. 5. That is, a difference occurs between the start time periods t1 and t2 of two lighting circuits 2.

The configuration of the lighting device 50 (FIG. 1) of the present embodiment to suppress the difference between the start time periods due to the difference between the forward voltages as above will be described below in more detail.

Each lighting circuit 2 includes: a resistor R1 connected in parallel with the output capacitor C1; and a resistor R2 that constitutes a series circuit together with the resistor R1. The resistor R2 is connected between the output ends of the DC power supply 12. Accordingly, even when a switching element Q1 is switched off and a corresponding light source 3 is turned off, a voltage Vout across the output capacitor C1 (i.e., an output voltage of each lighting circuit 2) is kept at a prescribed voltage Vp (hereinafter, referred to as a "pre-charge voltage") lower than a forward voltage Vf of the corresponding light source 3. The above pre-charge voltage Vp is a voltage obtained by dividing the output voltage Vdc of the DC power supply 12 with the resistors R1 and R2. In other words, the resistors R1 and R2 constitute a pre-charge circuit 15 (refer to FIG. 1).

Note that, in the explanation described below, resistors R1 and R2 of the first lighting circuit 2A are referred to also as first and second resistors R1A and R2A, respectively. Also, resistors R1 and R2 of the second lighting circuit 2B are referred to also as third and fourth resistors R1B and R2B, respectively. In addition, a pre-charge circuit 15 of the first lighting circuit 2A is referred to also as a first pre-charge circuit 15A, and a pre-charge circuit 15 of the second lighting circuit 2B is referred to also as a second pre-charge circuit 15B.

Resistance values of the resistors R1 and R2 of each lighting circuit 2 are set such that a value "Vf−Vp" obtained by subtracting the pre-charge voltage Vp from the forward voltage Vf of the light source 3 agrees with each of values "Vf−Vp" of all other lighting circuits 2. Thus, if voltages across output capacitors C1 in all lighting circuits 2 are increased at a common rate upon starting, it can be considered that start time periods starting from stable states of the voltages across the output capacitors C1 in all lighting circuits 2 agree with each other.

For example, the case where two lighting circuits, namely, first and second lighting circuits 2A and 2B are provided is considered. In this case, the above condition is represented as "Vf1−Vp1=Vf2−Vp2", where Vf1 and Vp1 are a forward voltage of a first light source 3A connected with the first lighting circuit 2A and a first pre-charge voltage (first voltage), respectively, and Vf2 and Vp2 are a forward voltage of a second light source 3B connected with the second lighting circuit 2B and a second pre-charge voltage (second voltage), respectively.

In the first lighting circuit 2A, when a resistance value of the first resistor R1A is defined as R11 and a resistance value of the second resistor R2A is defined as R21, the first pre-charge voltage Vp1 is represented as "Vp1=Vdc·R11/(R11+R21)", using the resistance value R11 of the first resistor R1A, the resistance value R21 of the second resistor R2A and the output voltage Vdc of the DC power supply 12.

In the second lighting circuit 2B, when a resistance value of the third resistor R1B is defined as R12 and a resistance value of the fourth resistor R2B is defined as R22, the second pre-charge voltage Vp2 is represented as "Vp2=Vdc·R12/(R12+R22)", using the resistance value R12 of the third resistor R1B, the resistance value R22 of the fourth resistor R2B and the output voltage Vdc of the DC power supply 12.

Accordingly, the condition: "Vf1−Vp1=Vf2−Vp2" can be rewritten to the following formula.

$$Vf1 - Vdc \times \frac{R11}{R11 + R21} = Vf2 - Vdc \times \frac{R12}{R12 + R22} \qquad \text{[Mathematical 1]}$$

Figure 6:
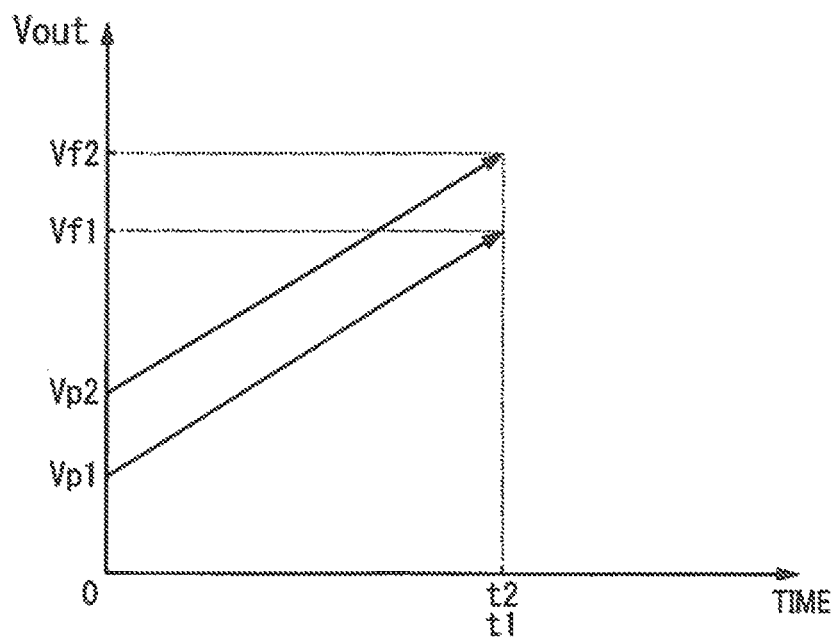
FIG. 6 is a diagram illustrating one example of a change in an output voltage Vout with time after starting of two lighting circuits in Embodiment 1.

In the lighting device 50 of the present embodiment, the resistance values R11, R12, R21 and R22 of the four resistors in the first and second pre-charge circuits 15A and 15B are set so as to meet the above condition. As shown in FIG. 6, it is therefore possible to suppress the difference between the start time periods t1 and t2 due to the difference between the forward voltages Vf1 and Vf2 otherwise shown in FIG. 5.

Note that each lighting circuit 2 is not limited to a step-down chopper circuit as above. Each lighting circuit 2 may be other well-known switching power supply such as a step-up chopper circuit, a step-up/step-down chopper circuit in combination of a step-up chopper circuit and a step-down chopper circuit, or a flyback circuit. In the case of any one of the alternatives, an output of the pre-charge voltage Vp can be achieved by switching the operation of the drive circuit 20 from the above-mentioned constant current operation to a constant current operation for keeping the output voltage Vout at the pre-charge voltage Vp for a period during which the light source 3 is in OFF state, for example. In the case of any one of the alternatives, instead of installation of the pre-charge circuit 15, the drive circuit 20 may function as a pre-charge circuit.

The number of lighting circuits 2 may be three or more, although it is two in the present embodiment. In other words, for example, the luminaire 1 may include three light sources 3, and three lighting circuits 2 respectively configured to cause the three light sources 3 to emit light. Also in this case, resistance values of the resistors R1 and R2 of each lighting circuit 2 are set such that a value "Vf–Vp" of each lighting circuit 2 agrees with each of values "Vf–Vp" of two other lighting circuits 2.

Embodiment 2

Figure 7:
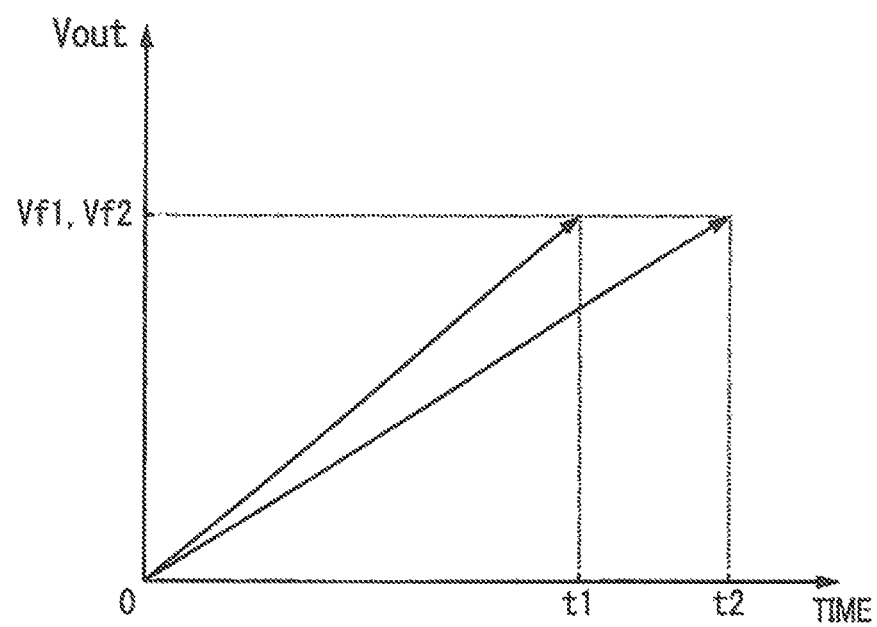
FIG. 7 is a diagram illustrating one example of a change in an output voltage Vout with time after starting of two lighting circuits in a comparative example with respect to Embodiment 2.

As factors that cause the difference between the start time periods in two lighting circuits, it can be considered a difference between rates at which voltages across output capacitors in the two lighting circuits (i.e., output voltages of two lighting circuits) are increased, in addition to the difference between the forward voltages (hereinafter, the rate will be referred to as the "charging rate"). Here, in the case of a comparative example in which capacitance values of first and second output capacitors C1A and C1B of first and second lighting circuits 2A and 2B are not subjected to setting described later, a difference between start time periods t1 and t2 occurs due to a difference between charging rates, as shown in FIG. 7. When the difference between the start time periods t1 and t2 is caused by the difference between the charging rates, it is impossible to suppress the difference between the start time periods t1 and t2, with the first and second pre-charge voltages Vp1 and Vp2 in Embodiment 1.

Figure 8:
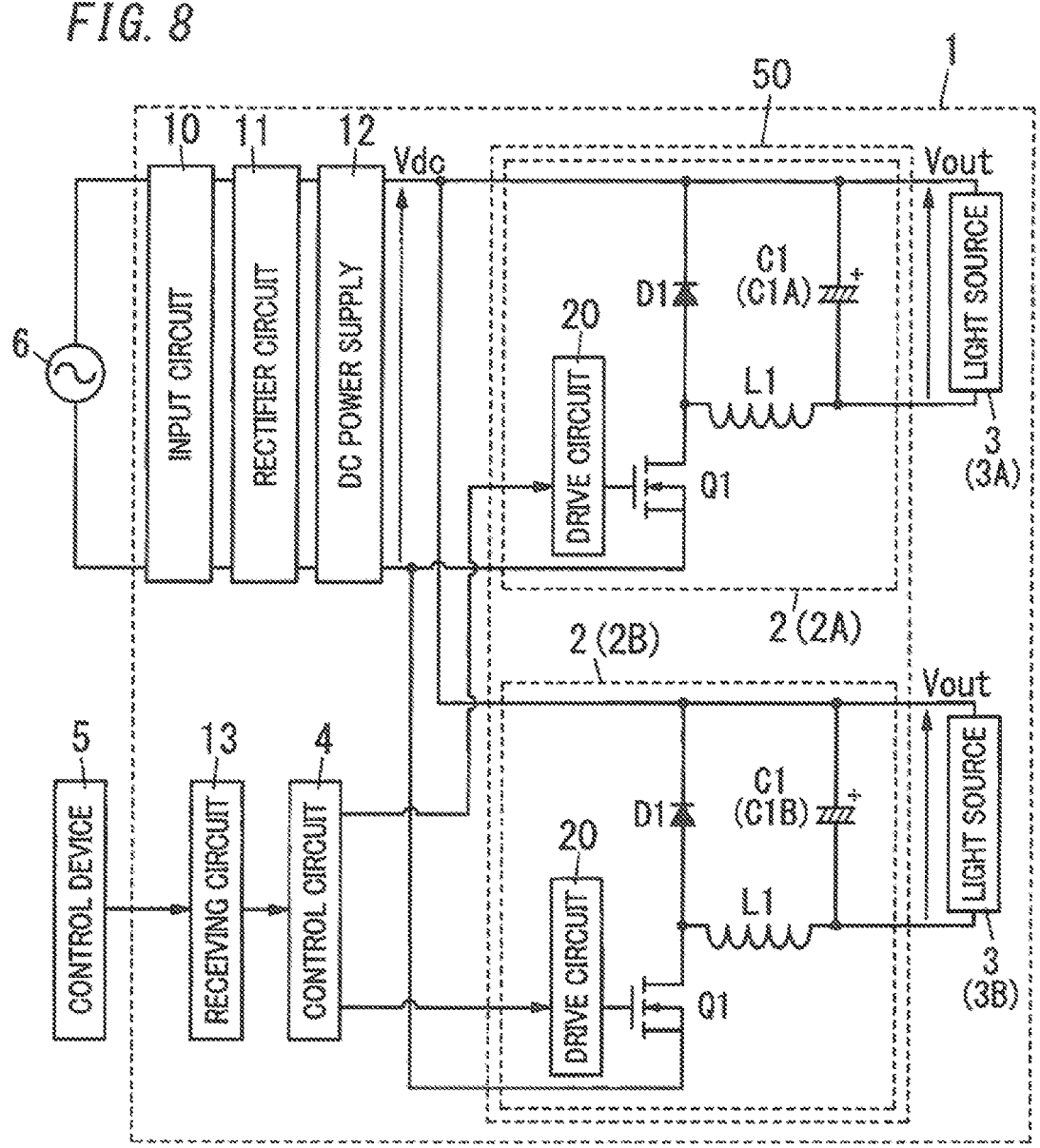
FIG. 8 is a circuit block diagram illustrating a luminaire according to Embodiment 2.

It is an object of the present embodiment to suppress the difference between the start time periods t1 and t2 due to the difference between the charging rates of the first and second output capacitors C1A and C1B, in the case where as shown in FIG. 7 there is no difference between forward voltages Vf1 and Vf2 of first and second light sources 3A and 3B connected with the first and second lighting circuits 2A and 2B. Accordingly, the pre-charge voltage is not required, and therefore a lighting device 50 of the present embodiment does not include the resistors R1 and R2 that constitute the pre-charge circuits 15, as shown in FIG. 8. Note that, elements similar to those of Embodiment 1 are assigned with same reference numerals, and explanation thereof will be omitted.

As factors that have an effect on the charging rate of each output capacitor C1, it can be considered an input current to each output capacitor C1 and a capacitance value of each output capacitor C1.

For example when the input current to each output capacitor C1 is constant, a time required for an output voltage Vout increasing by a fixed voltage is proportional to the capacitance value of each output capacitor C1, and the start time period is therefore approximately proportional to the capacitance value of each output capacitor C1.

When a drive circuit 20 of each lighting circuit 2 performs constant current operation for adjusting an output current to a prescribed target current, it can be considered that a time average value of an input current to a corresponding output capacitor C1 is approximately proportional to the target current, in other words, the start time period is approximately inversely proportional to the target current.

For this reason, in the present embodiment, a capacitance value of the output capacitor C1 of each lighting circuit 2 is set such that a ratio "C1/Ie" between a capacitance value C1 of the output capacitor C1 and a target current Ie agrees with each of ratios "C1/Ie" of all other lighting circuits 2.

For example in the case where two lighting circuits, namely, first and second lighting circuits 2A and 2B are provided, a relation as the following formula is met, regarding a capacitance value C11 of a first output capacitor C1A of the first lighting circuit 2A and a first target current Ie1, and a capacitance value C12 of a second output capacitor C1B of the second lighting circuit 2B and a second target current Ie2. That is, in the present embodiment, the capacitance value C11 and C12 of the first and second output capacitors C1A and C1B are set so as to meet the relation as the following formula.

$$\frac{C11}{Ie1} = \frac{C12}{Ie2} \qquad \text{[Mathematical 2]}$$

According to the above configuration, it is possible to suppress the difference between the start time periods t1 and t2 due to the difference between the charging rates of the two capacitors C1 as shown in FIG. 7.

Note that, each lighting circuits 2 of the present embodiment may further include the pre-charge circuits 15 of Embodiment 1, and be configured to meet the condition of Embodiment 1, in addition to the condition of the present embodiment. That is, in addition to the condition of the present embodiment, first and second pre-charge voltages Vp1 and Vp2 may be set such that a difference between a forward voltage of the first light source 3A and the first pre-charge voltage Vp1 agrees with a difference between a forward voltage of the second light source 3B and the second pre-charge voltage Vp2.

Embodiment 3

The basic configuration of the present embodiment is similar to that of Embodiment 1.

Figure 9:
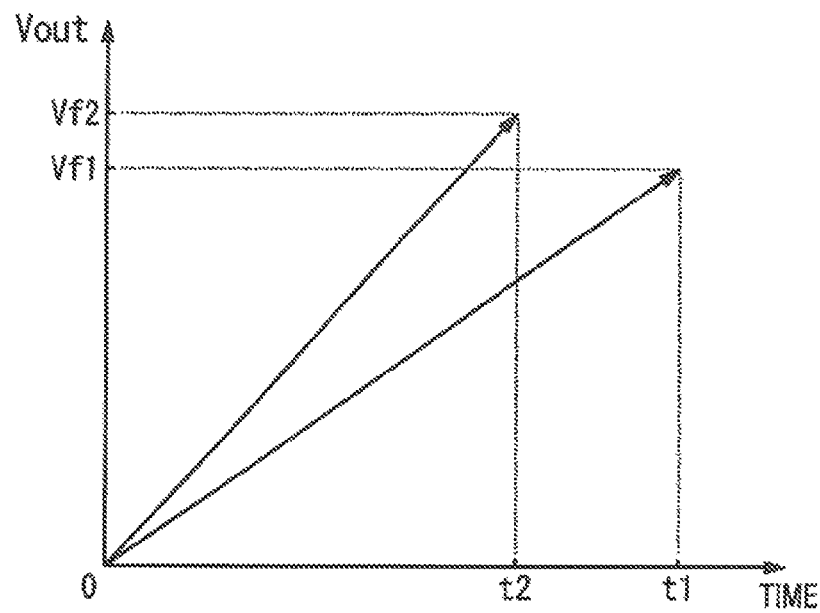
FIG. 9 is a diagram illustrating one example of a change in an output voltage Vout with time after starting of two lighting circuits in a comparative example with respect to Embodiment 3.
Figure 10:
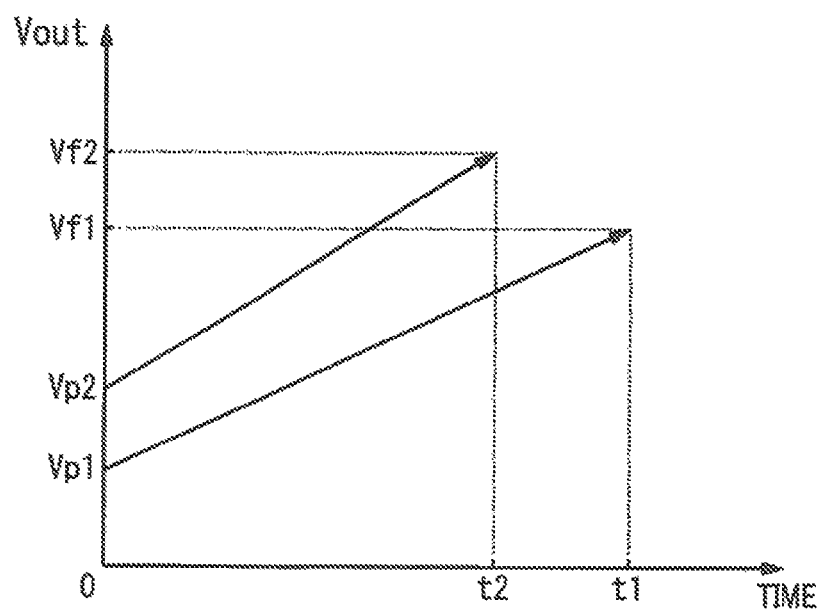
FIG. 10 is a diagram illustrating one example of a change in an output voltage Vout with time after starting of two lighting circuits in another comparative example with respect to Embodiment 3.

In Embodiment 1, it was assumed the case where the charging rates of the two output capacitors C1 are equal to each other and the forward voltages Vf1 and Vf2 are different from each other. In Embodiment 2, it was assumed the case where the forward voltages Vf1 and Vf2 are equal to each other and the charging rates of the two output capacitors C1 are different from each other. In the present embodiment, it is assumed that the forward voltages Vf1 and Vf2 are different from each other and also the charging rates of the two output capacitors C1 are different from each other in lighting circuits 2. In this case, in a comparative example where each lighting circuit 2 does not meet the condition of the present embodiment described later (values "C1×(Vf−Vp)/Ie" agree with each other), a large difference occurs between start time periods t1 and t2 as shown in FIG. 9. The difference between the start time periods t1 and t2 cannot be completely solved by only either the pre-charge voltage as Embodiment 1 or the capacitance value of the output capacitor C1 as Embodiment 2. For example even if only the first and second pre-charge voltages Vp1 and Vp2 as Embodiment 1 are applied to the comparative example in FIG. 9, the difference between the start time periods t1 and t2 cannot be completely solved, as shown in FIG. 10. Also, even if only the capacitance value C11 and C12 of the first and second output capacitors C1A and C1B as Embodiment 2 are applied to the comparative example in FIG. 9, it results in FIG. 5, and the difference between the start time periods t1 and t2 cannot be completely solved.

In the present embodiment, in order to make the start time periods agree with each other even in the above case, a pre-charge voltage Vp and a capacitance value C1 of the output capacitor C1 of each lighting circuit 2 are set such that a value "C1×(Vf−Vp)/Ie" of each lighting circuit 2 agrees with each of values "C1×(Vf−Vp)/Ie" of all other lighting circuits 2. The value is obtained by dividing, by a target current Ie, a product of; a difference between a forward voltage Vf and the pre-charge voltage Vp; and the capacitance value C1 of the output capacitor C1. In this case, it is not required to meet the conditions of Embodiments 1 and 2 individually.

In the case where two lighting circuits, namely, first and second lighting circuits 2A and 2B are provided, the condition to be met in the present embodiment is represented by the following formula, using a forward voltage Vf1 of a first light source 3A connected with the first lighting circuit 2A, a resistance value R11 of a first resistor R1A, a resistance value R21 of a second resistor R2A, a capacitance value C11 of a first output capacitor C1A, a first target current Ie1, a forward voltage Vf2 of a second light source 3B connected with the second lighting circuit 2B, a resistance value R12 of a third resistor R1B, a resistance value R22 of a fourth resistor R2B, a capacitance value C12 of a second output capacitor C1B, and a second target current Ie2.

$$\frac{C11}{Ie1}\left(Vf1 - Vdc \times \frac{R11}{R11+R21}\right) = \frac{C12}{Ie2}\left(Vf2 - Vdc \times \frac{R12}{R12+R22}\right)$$ [Mathematical 3]

The matters other than the above are similar to those of Embodiment 1, and explanation thereof is therefore omitted. Note that, both of the conditions of the present embodiment and Embodiment 1 may be met, or both of the conditions of the present embodiment and Embodiment 2 may be met. That is, in addition to the condition of the present embodiment, first and second pre-charge voltages Vp1 and Vp2 may be set such that a difference between a forward voltage of the first light source 3A and the first pre-charge voltage Vp1 agrees with a difference between a forward voltage of the second light source 3B and the second pre-charge voltage Vp2. Alternatively, in addition to the condition of the present embodiment, the capacitance values of the first and second output capacitors C1A and C1B may be set such that a ratio between the capacitance value of the first output capacitor C1A and the first target current Ie1 agrees with a ratio between the capacitance value of the second output capacitor C1B and the second target current Ie2. Alternatively, all of the conditions of the present embodiment, Embodiment 1 and Embodiment 2 may be met.

As apparent from Embodiments 1 to 3 described above, a lighting device (50) according to a first aspect of the present technology includes, as at least two lighting circuits (2), a first lighting circuit (2A) and a second lighting circuit (2B) that are configured to receive electric power from a single common power supply (DC power supply 12) for providing power to first and second light sources (3A, 3B), respectively, each including one or more solid-state light-emitting elements (30). The first lighting circuit (2A) is configured to cause the first light source (3A) to emit light. The second lighting circuit (2B) is configured to cause the second light source (3B), which is different from the first light source (3A), to emit light. Each of the first and second lighting circuits (2A, 2B) includes a switching power supply. The first lighting circuit (2A) further includes: a first output capacitor (C1A) connected between output ends of the first lighting circuit (2A); and a first pre-charge circuit (15A) configured to keep a voltage across the first output capacitor (C1A) at a first voltage (Vp1) predetermined for the first lighting circuit (2A), while the first light source (3A) is in OFF state. The second lighting circuit (2B) further includes: a second output capacitor (C1B) connected between output ends of the second lighting circuit (2B); and a second pre-charge circuit (15B) configured to keep a voltage across the second output capacitor (C1B) at a second voltage (Vp2) predetermined for the second lighting circuit (2B), while the second light source (3B) is in OFF state. The first and second voltages (Vp1, Vp2) are set such that a difference between a forward voltage of the first light source (3A) and the first voltage (Vp1) agrees with a difference between a forward voltage of the second light source (3B) and the second voltage (Vp2).

According to the first aspect, it is possible to suppress a difference between start time periods of two or more lighting circuits (2), and accordingly variation in the brightness of two or more light sources (3) and further variation in the light color provided by the color mixture.

Regarding a lighting device (50) according to a second aspect of the present technology, in the first aspect, the first pre-charge circuit (15A) includes a first resistor (R1A) and a second resistor (R2A). The first resistor (R1A) is connected in parallel with the first output capacitor (C1A). The second resistor (R2A) is connected in series with the first resistor (R1A). A circuit of the first resistor (R1A) and the second resistor (R2A) is connected between output ends of the single common power supply. The second pre-charge circuit (15B) includes a third resistor (R1B) and a fourth resistor (R2B). The third resistor (R1B) is connected in parallel with the second output capacitor (C1B). The fourth resistor (R2B) is connected in series with the third resistor (R1B). A circuit of the third resistor (R1B) and the fourth resistor (R2B) is connected between the output ends of the single common power supply.

Regarding a lighting device (50) according to a third aspect of the present technology, in the first aspect, the first lighting circuit (2A) is configured to perform, while the first light source (3A) is in ON state, constant current operation for adjusting an output current to be output to the first light source (3A) to a first target current (Ie1) predetermined for the first lighting circuit (2A). The second lighting circuit (2B) is configured to perform, while the second light source (3B) is in ON state, constant current operation for adjusting an output current to be output to the second light source (3B) to a second target current (Ie2) predetermined for the second lighting circuit (2B). Capacitance values of the first and second output capacitors (C1A, C1B) are set such that a ratio between the capacitance value of the first output capacitor (C1A) and the first target current (Te1) agrees with a ratio between the capacitance value of the second output capacitor (C1B) and the second target current (Ie2).

According to the third aspect, it is possible to further suppress a difference between start time periods of two or more lighting circuits (2).

Regarding a lighting device (50) according to a fourth aspect of the present technology, in the first aspect, the first lighting circuit (2A) is configured to perform, while the first light source (3A) is in ON state, constant current operation for adjusting an output current to be output to the first light source (3A) to a first target current (Te1) predetermined for the first lighting circuit (2A). The second lighting circuit (2B) is configured to perform, while the second light source (3B) is in ON state, constant current operation for adjusting an output current to be output to the second light source (3B) to a second target current (Ie2) predetermined for the second lighting circuit (2B). The first and second voltages (Vp1, Vp2), and capacitance values of the first and second output capacitors (C1A, C1B) are set such that a first value agrees with a second value. The first value is obtained by dividing, by the first target current (Te1), a product of: the difference between the forward voltage of the first light source (3A) and the first voltage (Vp1); and the capacitance value of the first output capacitor (C1A). The second value is obtained by dividing, by the second target current (Ie2), a product of: the difference between the forward voltage of the second light source (3B) and the second voltage (Vp2); and the capacitance value of the second output capacitor (C1B).

According to the fourth aspect, it is possible to further suppress a difference between start time periods of two or more lighting circuits (2).

A lighting device (50) according to a fifth aspect of the present technology includes, as at least two lighting circuits (2), a first lighting circuit (2A) and a second lighting circuit (2B) that are configured to receive electric power from a single common power supply (DC power supply 12) for providing power to first and second light sources (3A, 3B), respectively, each including one or more solid-state light-emitting elements (30). The first lighting circuit (2A) is configured to cause the first light source (3A) to emit light. The second lighting circuit (2B) is configured to cause the second light source (3B), which is different from the first light source (3A), to emit light. The first lighting circuit (2A) includes: a first output capacitor (C1A) connected between output ends of the first lighting circuit (2A); and a switching power supply configured to perform, while the first light source (3A) is in ON state, constant current operation for adjusting an output current to be output to the first light source (3A) to a first target current (Te1) predetermined for the first lighting circuit (2A). The second lighting circuit (2B) includes: a second output capacitor (C1B) connected between output ends of the second lighting circuit (2B); and a switching power supply configured to perform, while the second light source (3B) is in ON state, constant current operation for adjusting an output current to be output to the second light source (3B) to a second target current (Ie2) predetermined for the second lighting circuit (2B). Capacitance values of the first and second output capacitors (C1A, C1B) are set such that a ratio between the capacitance value of the first output capacitor (CIA) and the first target current (Te1) agrees with a ratio between the capacitance value of the second output capacitor (C1B) and the second target current (Ie2).

According to the fifth aspect, it is possible to suppress a difference between start time periods of two or more lighting circuits (2), and accordingly variation in the brightness of two or more light sources (3) and further variation in the light color provided by the color mixture.

A lighting device (50) according to a sixth aspect of the present technology includes, as at least two lighting circuits (2), a first lighting circuit (2A) and a second lighting circuit (2B) that are configured to receive electric power from a single common power supply (DC power supply 12) for providing power to first and second light sources (3A, 3B), respectively, each including one or more solid-state light-emitting elements (30). The first lighting circuit (2A) is configured to cause the first light source (3A) to emit light. The second lighting circuit (2B) is configured to cause the second light source (3B), which is different from the first light source (3A), to emit light. The first lighting circuit (2A) includes a switching power supply configured to perform, while the first light source (3A) is in ON state, constant current operation for adjusting an output current to be output to the first light source (3A) to a first target current (Te1) predetermined for the first lighting circuit (2A). The first lighting circuit (2A) further includes: a first output capacitor (C1A) connected between output ends of the first lighting circuit (2A); and a first pre-charge circuit (15A) configured to keep a voltage across the first output capacitor (C1A) at a first voltage (Vp1) predetermined for the first lighting circuit (2A), while the first light source (3A) is in OFF state. The second lighting circuit (2B) includes a switching power supply configured to perform, while the second light source (3B) is in ON state, constant current operation for adjusting an output current to be output to the second light source (3B) to a second target current (Ie2) predetermined for the second lighting circuit (2B). The second lighting circuit (2B) further includes: a second output capacitor (C1B) connected between output ends of the second lighting circuit (2B); and a second pre-charge circuit (15B) configured to keep a voltage across the second output capacitor (C1B) at a second voltage (Vp2) predetermined for the second lighting circuit (2B), while the second light source (3B) is in OFF state. The first and second voltages (Vp1, Vp2), and capacitance values of the first and second output capacitors (C1A, C1B) are set such that a first value agrees with a second value. The first value is obtained by dividing, by the first target current (Te1), a product of: the difference between the forward voltage of the first light source (3A) and the first voltage (Vp1); and the capacitance value of the first output capacitor (C1A). The second value is obtained by dividing, by the second target current (Ie2), a product of: the difference between the forward voltage of the second light source (3B) and the second voltage (Vp2); and the capacitance value of the second output capacitor (C1B).

According to the sixth aspect, it is possible to suppress a difference between start time periods of two or more lighting circuits (2), and accordingly variation in the brightness of two or more light sources (3) and further variation in the light color provided by the color mixture.

A luminaire (1) according to a seventh aspect of the present technology includes the lighting device (50) according to any one of the first to sixth aspects and the first and second light sources (3A, 3B) respectively coupled across the first and second output capacitors (CIA, C1B).

According to the seventh aspect, it is possible to provide a luminaire (1), which can suppress a difference between start time periods of two or more lighting circuits (2).

A lighting system according to an eighth aspect of the present technology includes: at least two luminaires (1) according to the seventh aspect; and a control device (5) configured to control the at least two luminaires (1) individually.

According to the eighth aspect, it is possible to provide a lighting system including two or more luminaires (1), each of which can suppress a difference between start time periods of two or more lighting circuits (2).

A lighting device (50) according to a ninth aspect of the present technology is for providing power to a first light source (3A) and a second light source (3B), each having a different forward voltage. The lighting device (50) includes a first lighting circuit (2A) and a second lighting circuit (2B), different from the first lighting circuit (2A), for respectively providing an operating voltage across the first and second lighting sources (3A, 3B) when in an ON state. The first lighting circuit (2A) includes a first pre-charge circuit (15A) configured to keep a first pre-charge voltage across the first light source (3A) when in an OFF state. The second lighting circuit (2B) includes a second pre-charge circuit (15B) configured to keep a second pre-charge voltage across the second light source (3B) when in an OFF state. The first and second pre-charge voltages are set such that a difference between the forward voltage of the first light source (3A) and the first pre-charge voltage agrees with a difference between the forward voltage of the second light source (3B) and the second pre-charge voltage.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device comprising, as at least two lighting circuits, a first lighting circuit and a second lighting circuit that are configured to receive electric power from a single common power supply for providing power to first and second light sources, respectively, each including one or more solid-state light-emitting elements,
   the first lighting circuit being configured to cause the first light source to emit light,
   the second lighting circuit being configured to cause the second light source, which is different from the first light source, to emit light,
   each of the first and second lighting circuits including a switching power supply,
   the first lighting circuit further including:
      a first output capacitor connected between output ends of the first lighting circuit; and
      a first pre-charge circuit configured to keep a voltage across the first output capacitor at a first voltage predetermined for the first lighting circuit, while the first light source is in OFF state,
   the second lighting circuit further including:
      a second output capacitor connected between output ends of the second lighting circuit; and
      a second pre-charge circuit configured to keep a voltage across the second output capacitor at a second voltage predetermined for the second lighting circuit, while the second light source is in OFF state, and
   the first and second voltages being set such that a difference between a forward voltage of the first light source and the first voltage agrees with a difference between a forward voltage of the second light source and the second voltage.

2. The lighting device according to claim 1, wherein:
   the first pre-charge circuit includes a first resistor and a second resistor,
   the first resistor being connected in parallel with the first output capacitor,
   the second resistor being connected in series with the first resistor,
   a circuit of the first resistor and the second resistor being connected between output ends of the single common power supply; and
   the second pre-charge circuit includes a third resistor and a fourth resistor,
   the third resistor being connected in parallel with the second output capacitor,
   the fourth resistor being connected in series with the third resistor,
   a circuit of the third resistor and the fourth resistor being connected between the output ends of the single common power supply.

3. The lighting device according to claim 1, wherein:
   the first lighting circuit is configured to perform, while the first light source is in ON state, constant current operation for adjusting an output current to be output to the first light source to a first target current predetermined for the first lighting circuit;
   the second lighting circuit is configured to perform, while the second light source is in ON state, constant current operation for adjusting an output current to be output to the second light source to a second target current predetermined for the second lighting circuit; and
   capacitance values of the first and second output capacitors are set such that a ratio between the capacitance value of the first output capacitor and the first target current agrees with a ratio between the capacitance value of the second output capacitor and the second target current.

4. The lighting device according to claim 1, wherein:
   the first lighting circuit is configured to perform, while the first light source is in ON state, constant current operation for adjusting an output current to be output to the first light source to a first target current predetermined for the first lighting circuit;
   the second lighting circuit is configured to perform, while the second light source is in ON state, constant current operation for adjusting an output current to be output to the second light source to a second target current predetermined for the second lighting circuit; and
   the first and second voltages, and capacitance values of the first and second output capacitors are set such that a first value agrees with a second value,
   the first value being obtained by dividing, by the first target current, a product of: the difference between the forward voltage of the first light source and the first voltage; and the capacitance value of the first output capacitor, and
   the second value being obtained by dividing, by the second target current, a product of: the difference between the forward voltage of the second light source and the second voltage; and the capacitance value of the second output capacitor.

5. A lighting device comprising, as at least two lighting circuits, a first lighting circuit and a second lighting circuit that are configured to receive electric power from a single common power supply for providing power to first and second light sources, respectively, each including one or more solid-state light-emitting elements,
  the first lighting circuit being configured to cause the first light source to emit light,
  the second lighting circuit being configured to cause the second light source, which is different from the first light source, to emit light,
  the first lighting circuit including: a first output capacitor connected between output ends of the first lighting circuit; and a switching power supply configured to perform, while the first light source is in ON state, constant current operation for adjusting an output current to be output to the first light source to a first target current predetermined for the first lighting circuit,
  the second lighting circuit including: a second output capacitor connected between output ends of the second lighting circuit; and a switching power supply configured to perform, while the second light source is in ON state, constant current operation for adjusting an output current to be output to the second light source to a second target current predetermined for the second lighting circuit, and
  capacitance values of the first and second output capacitors are set such that a ratio between the capacitance value of the first output capacitor and the first target current agrees with a ratio between the capacitance value of the second output capacitor and the second target current.

6. A lighting device comprising, as at least two lighting circuits, a first lighting circuit and a second lighting circuit that are configured to receive electric power from a single common power supply for providing power to first and second light sources, respectively, each including one or more solid-state light-emitting elements,
  the first lighting circuit being configured to cause the first light source to emit light,
  the second lighting circuit being configured to cause the second light source, which is different from the first light source, to emit light,
  the first lighting circuit including a switching power supply configured to perform, while the first light source is in ON state, constant current operation for adjusting an output current to be output to the first light source to a first target current predetermined for the first lighting circuit,
  the first lighting circuit further including:
    a first output capacitor connected between output ends of the first lighting circuit; and
    a first pre-charge circuit configured to keep a voltage across the first output capacitor at a first voltage predetermined for the first lighting circuit, while the first light source is in OFF state,
  the second lighting circuit including a switching power supply configured to perform, while the second light source is in ON state, constant current operation for adjusting an output current to be output to the second light source to a second target current predetermined for the second lighting circuit,
  the second lighting circuit further including:
    a second output capacitor connected between output ends of the second lighting circuit; and
    a second pre-charge circuit configured to keep a voltage across the second output capacitor at a second voltage predetermined for the second lighting circuit, while the second light source is in OFF state,
  the first and second voltages, and capacitance values of the first and second output capacitors are set such that a first value agrees with a second value,
  the first value being obtained by dividing, by the first target current, a product of: the difference between the forward voltage of the first light source and the first voltage; and the capacitance value of the first output capacitor, and
  the second value being obtained by dividing, by the second target current, a product of: the difference between the forward voltage of the second light source and the second voltage; and the capacitance value of the second output capacitor.

7. A luminaire, comprising:
the lighting device according to claim 1; and
the first and second light sources respectively coupled across the first and second output capacitors.

8. A luminaire, comprising:
the lighting device according to claim 2; and
the first and second light sources respectively coupled across the first and second output capacitors.

9. A luminaire, comprising:
the lighting device according to claim 3; and
the first and second light sources respectively coupled across the first and second output capacitors.

10. A luminaire, comprising:
the lighting device according to claim 4; and
the first and second light sources respectively coupled across the first and second output capacitors.

11. A luminaire, comprising:
the lighting device according to claim 5; and
the first and second light sources respectively coupled across the first and second output capacitors.

12. A luminaire, comprising:
the lighting device according to claim 6; and
the first and second light sources respectively coupled across the first and second output capacitors.

13. A lighting system, comprising:
at least two luminaires according to claim 7; and
a control device configured to control the at least two luminaires individually.

14. A lighting system, comprising:
at least two luminaires according to claim 8; and
a control device configured to control the at least two luminaires individually.

15. A lighting system, comprising:
at least two luminaires according to claim 9; and
a control device configured to control the at least two luminaires individually.

16. A lighting system, comprising:
at least two luminaires according to claim 10; and
a control device configured to control the at least two luminaires individually.

17. A lighting system, comprising:
at least two luminaires according to claim 11; and
a control device configured to control the at least two luminaires individually.

18. A lighting system, comprising:
at least two luminaires according to claim 12; and
a control device configured to control the at least two luminaires individually.

* * * * *